United States Patent Office 2,715,304
Patented Aug. 16, 1955

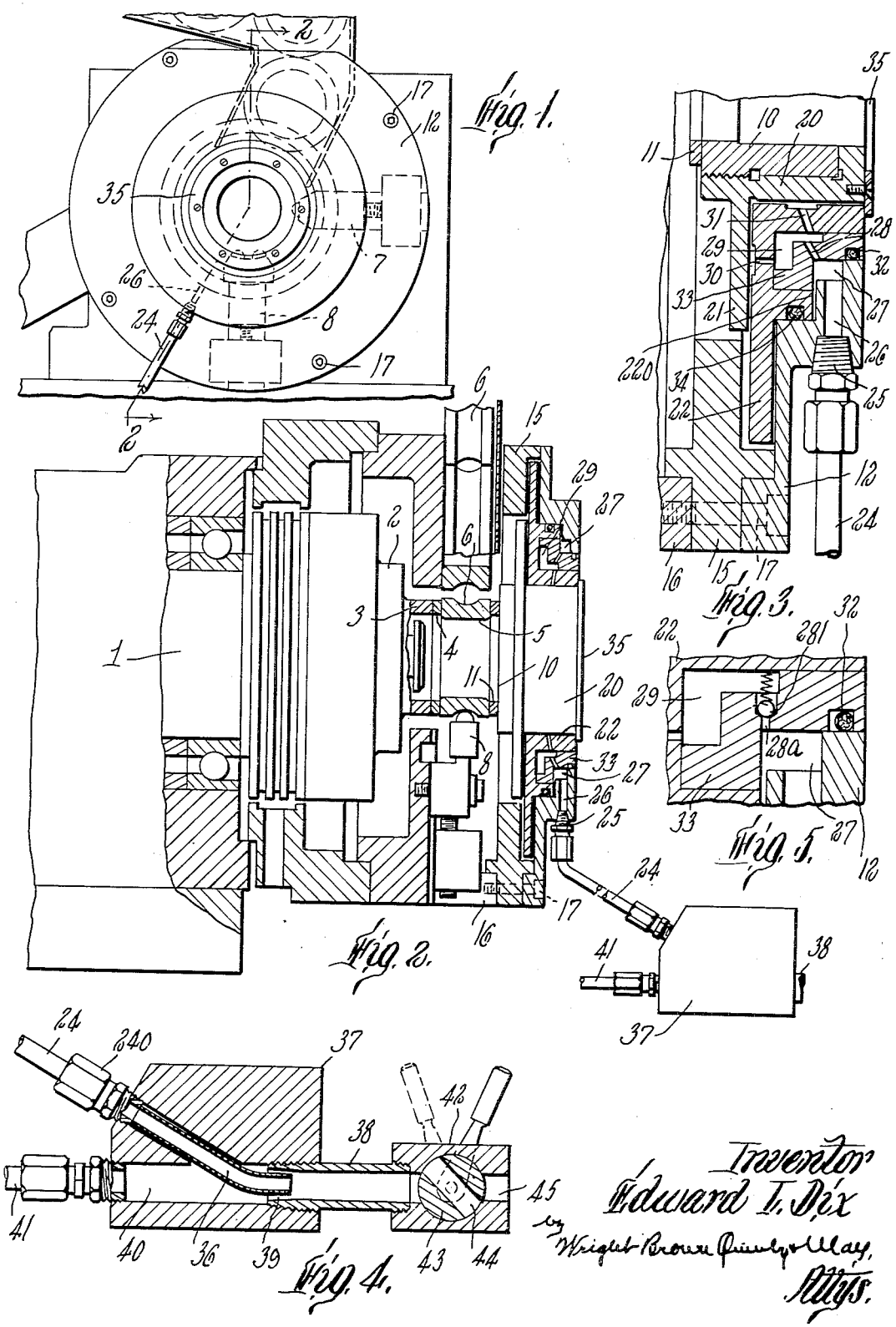

2,715,304

WORK CLAMPING AND RELEASING MECHANISM FOR CENTERLESS GRINDING MACHINES

Edward L. Dix, Chester, Vt., assignor to Bryant Chucking Grinder Company, Springfield, Vt., a corporation of Vermont Application June 1, 1953, Serial No. 358,880

7 Claims. (Cl. 51—236)

This invention relates to centerless grinding machines and more particularly to machines by which work pieces are clamped and released with reference to the spindle by which they are rotated, and has for an object to simplify such mechanism.

More particularly this invention provides fluid pressure means by which both clamping and releasing may be effected at the will of the operator.

The clamping is effected by direct fluid pressure in accordance with this invention, while the releasing is effected by causing the fluid pressure to produce an aspirating effect on the clamping mechanism which reduces the clamping pressure to sub-atmospheric, whereupon atmospheric pressure effects the release of the work piece.

A further object of this invention is to provide an improved construction for directing the fluid with respect to the clamping mechanism.

For a complete understanding of this invention, reference may be had to the accompanying drawings in which Figure 1 is a fragmentary front elevation of a work spindle arranged for centerless grinding and embodying the invention.

Figure 2 is a fragmentary view partly in side elevation and partly broken away and in section on line 2—2 of Figure 1.

Figure 3 is a view similar to a portion of Figure 2, but on a larger scale and showing the parts in work-released condition.

Figure 4 is a somewhat diagrammatic sectional view of the pressure control mechanism.

Figure 5 is a view similar to a portion of Figure 3, but showing a modified construction.

Referring to the drawings, at 1 is indicated a rotary work spindle carrying a face plate 2 having an annular flange 3 provided with a clamping ring 4 against the outer transverse face of which may be seated a circular work piece such as 5 which is to be internally ground concentric with an outer finished face 6.

The outer peripheral finished face of the work piece engages a pair of angularly spaced shoes 7 and 8 against which the work piece may be supported during the grinding operation. The work piece may be pressed against these shoes by any suitable means, as, for example, by the use of an end clamping member 10 having a ring 11 which may be pressed against the outer face of the work piece and clamp it against the ring 4. This clamping member 10 may be eccentric to the spindle axis while the work piece is concentric with this axis as more fully described and claimed in my application for patent Serial No. 366,217, filed July 6, 1953, for Centerless Grinding Machine, or other arrangements may be used to press the work piece against the shoes during a grinding operation, such means per se forming no part of the present invention.

The clamping member 10, as shown best in Figure 3, is nested inside and secured to an annular body 20 which is provided with an outwardly directed flange portion 21 at one end. At its other end it is provided with a confining washer 35. The outside of the body 20 forms a journal rotatable in the bearing provided by the inside of the piston comprising the member 22 and the member 33, which are secured together by a press fit. There is a slight clearance between the inner face of the member 22 and the flange portion 21 limited in its maximum amount by contact of the member 22 with the confining washer 35. The piston comprising the members 22 and 33 is non-rotatable with the members 10 and 20, but is axially slidable on the member 12, which is held stationary to an intermediate support 15 and a stationary support 16 by means of bolts 17.

Between the member 33 and the member 12 is formed an annular outer chamber 27 to which fluid under pressure can be admitted through the passage 26. Between the piston unit and the member 12 are arranged suitable packing means indicated as O-rings at 32 and 34. The annular chamber 27 is connected with the annular chamber 29 between the members 22 and 33 by one or several drilled passages 28. From the chamber 29 leads a multiplicity of drilled passages 31 to the radial bearing for the journal part of the body 20, and a multiplicity of passages 30 axially to one face of the part 22 which is spaced from the opposing flange 21 and forms a thrust bearing for the rotatable system. These journal and thrust bearings are of the externally pressurized air bearing type known in the art.

It will be evident that when fluid under pressure is introduced into annular chamber 27, the system comprising the bearing 22 and the member 33 acts as a piston and it will be moved over to the left as viewed in Figures 2 and 3 as far as it is permitted by the engagement of the ring 11 against the work piece and the work piece against the ring 4.

When fluid is introduced into the chamber 27, the passages 28 admit the same pressurized media to the chamber 29 and further by way of the passages 30 and 31 to the thrust and journal bearings hereinbefore mentioned. If now instead, a subatmospheric condition is produced in the annular chamber 27, atmospheric pressure on the left hand side of the member 22 will move the piston system to the right and release the clamping force from the face of the ring 11.

It will be noted that the piston system is movable axially but it is non-rotatable, while the members 10 and 20 are journaled thereon and rotate as well as are movable axially with the piston system.

A simple means by which the high pressure or subatmospheric pressure conditions may be developed at will is illustrated in Figure 4. The outer end of the pipe 24 is connected through a thimble 240 with a pipe 36 mounted in a block 37 and having its end portion entering into a sleeve 38 threaded into the block 37 at one end. The sleeve 38 and the pipe 36 are spaced apart at 39 so that air coming into the passage 40 in the block through the supply pipe 41 may pass around the end of the pipe 39, enter the sleeve 38 and if the outer end of this sleeve is closed, pass into the open end of the pipe 36 and into the space between the work clamp and its fixed support. If, on the other hand, the outer end of the sleeve 38 is opened to atmosphere, the passage of air from the supply pipe 41 through the passage 40 and the sleeve 38 will produce an aspirating effect at the adjacent end of the pipe 36 which will draw air out from the clamp space so that subatmospheric pressure conditions will be produced therein. The control at the outer end of the sleeve 38 is effected through a valve 42 shown as a simple two-way valve, the valve body 43 having a passage 44 therethrough which may be turned out of registry with the outer end of the sleeve 38 and a discharge passage 45 in the valve block 42.

When the valve is turned to shut off the discharge from the sleeve 38, air under pressure from the pipe 41 passes into the sleeve 38 and from there into the pipe 36 and back through the pipe connections to the space between the work clamp and the stationary holder, thus causing the work clamp to be moved to the left as far as possible into work-clamping position.

If now the valve 43 be turned to open the sleeve 38 to discharge, air passing the open end of the pipe 36 will produce an aspirating effect, drawing the air out therefrom and through the pipe connections, from the space between the clamp and the stationary member, thus reducing the pressure in this space to subatmospheric whereupon atmospheric pressure acting upon the outer face of the clamp ring will withdraw the clamp sufficiently to release the work piece. This aspirating effect may be increased by forming the base of the sleeve 38 tapering as shown, to produce a venturi effect.

In Figure 5 a modification is shown in which the connecting passage or passages 28a each contain a check valve 281 shown as a spring loaded ball which will allow fluid under pressure to pass freely from the outer chamber 27 to the inner chamber 29, but will prevent reverse flow of fluid during the phase of operation when sub-atmospheric conditions prevail in the outer chamber 27. By this means it is possible to trap the load supporting media in the thrust and journal bearings for a moment during the time when it is desired to unload a finished work piece and to load another work piece to the ground. It is not necessary to stop the rotation of the spindle in order to remove and replace the work piece, and the grinding time is so short that to do this would unnecessarily slow the continued operation of the machine. By the use of the check valve 281, the chamber 27 is also closed off from the detrimental effects of seepage of air from the outside by way of the bearings during the period of sub-atmospheric conditions, resulting in quicker reduction of pressure within the confined chamber with a consequent quicker unclamping effect on the work piece.

From the foregoing description of an embodiment of this invention, it should be evident to those skilled in the art that various changes and modifications may be made therein without departing from the spirit or scope of the invention.

I claim:

1. In combination with a rotary spindle carrying a face plate at one end presenting a face transverse to the axis of said spindle against which an article to be ground may be clamped, a clamp mounted for motion toward and from said face, a stationary member outwardly of said clamp defining a space between it and said clamp, a pipe having one end leading into said space, a sleeve into which the opposite end of said pipe extends in spaced relation, means for introducing fluid under pressure into said sleeve around said pipe, and valve means at the opposite end of said sleeve which when closed prevents fluid pressure in said sleeve from passing through said pipe and which when opened permits discharge of fluid under pressure from said sleeve and produces an aspirating effect adjacent to said opposite pipe end causing sub-atmospheric pressure conditions within said space.

2. In combination with a rotary spindle carrying a face plate at one end presenting a face transverse to the axis of said spindle against which an article to be ground may be clamped, a clamp mounted for motion toward and from said face, a stationary member outwardly of said clamp defining a space between it and said clamp, a pipe having one end leading into said space, a sleeve into which the opposite end of said pipe extends in spaced relation, means for introducing fluid under pressure into said sleeve around said pipe, and valve means at the opposite end of said sleeve which when closed prevents fluid pressure in said sleeve from passing through said pipe and which when opened permits discharge of fluid under pressure from said sleeve and produces an aspirating effect adjacent to said opposite pipe end causing sub-atmospheric pressure conditions within said space, said sleeve being tapered lengthwise to produce a venturi effect adjacent to said pipe.

3. The combination with a rotary spindle fixed in axial direction, of a face plate carried by one end of said spindle and presenting a face transverse to the axis of said spindle, a member mounted for rotation about said axis and for axial motion and having a second face for coaction with said transverse face to clamp a work piece therebetween, a non-rotary axially movable member on which said rotary member is journaled, a stationary member, means sealing said stationary member to said non-rotary axially movable member, and means for selectively producing pressure or sub-atmospheric conditions between said stationary and non-rotary axially movable member to effect clamping or unclamping motions respectively of said rotary and axially movable member with respect to said face plate.

4. The combination with a rotary spindle fixed in axial direction, of a face plate carried by one end of said spindle and presenting a face transverse to the axis of said spindle, a member mounted for rotation about said axis and for axial motion and having a second face for coaction with said transverse face to clamp a work piece therebetween, a non-rotary axially movable member on which said rotary member is journaled, a stationary member, means sealing said stationary member to said non-rotary axially movable member, and means for selectively producing pressure or sub-atmospheric conditions between said stationary and non-rotary axially movable member to effect clamping or unclamping motions respectively of said rotary and axially movable member with respect to said face plate, said non-rotary axially movable member and said rotary and axially movable member having confronting thrust bearing faces.

5. The combination with a rotary spindle fixed in axial direction, of a face plate carried by one end of said spindle and presenting a face transverse to the axis of said spindle, a member mounted for rotation about said axis and for axial motion and having a second face for coaction with said transverse face to clamp a work piece therebetween, a non-rotary axially movable member on which said rotary member is journaled, a stationary member, means sealing said stationary member to said non-rotary axially movable member, means for selectively producing pressure or sub-atmospheric conditions between said stationary and non-rotary axially movable member to effect clamping or unclamping motions respectively of said rotary and axially movable member with respect to said face plate, said non-rotary axially movable member and said rotary and axially movable member having confronting thrust bearing faces, and means for introducing fluid between said confronting faces and between the journal faces.

6. The combination with a rotary spindle fixed in axial direction, of a face plate carried by one end of said spindle and presenting a face transverse to the axis of said spindle, a member mounted for rotation about said axis and for axial motion and having a second face for coaction with said transverse face to clamp a work piece therebetween, a non-rotary axially movable member on which said rotary member is journaled, a stationary member, means sealing said stationary member to said non-rotary axially movable member, and means for selectively producing pressure or sub-atmospheric conditions between said stationary and non-rotary axially movable member to effect clamping or unclamping motions respectively of said rotary and axially movable member with respect to said face plate, said non-rotary axially movable member and said rotary and axially movable member having confronting thrust bearing faces, said non-rotary and axially movable member having passages therethrough between said stationary member and said rotatable member.

7. The combination with a rotary spindle fixed in axial direction, of a face plate carried by one end of said spindle and presenting a face transverse to the axis of said spindle, a member mounted for rotation about said axis and for axial motion and having a second face for coaction with said transverse face to clamp a work piece therebetween, a non-rotary axially movable member on which said rotary member is journaled, a stationary member, means sealing said stationary member to said non-rotary axially movable member, means for selectively producing pressure or sub-atmospheric conditions between said stationary and non-rotary axially movable member to effect clamping or unclamping motions respectively of said rotary and axially movable member with respect to said face plate, said non-rotary axially movable member and said rotary and axially movable member having confronting thrust bearing faces, said non-rotary and axially movable member having passages therethrough between said stationary member and said rotatable member, and check valves in said passages preventing passage of fluid from between said rotary and non-rotary axially movable members under sub-atmospheric conditions between said stationary and non-rotary axially movable members.

References Cited in the file of this patent

UNITED STATES PATENTS

| | | |
|---|---|---|
| 1,098,025 | Domizi | May 26, 1914 |
| 1,446,026 | Wetmore | Feb. 20, 1923 |
| 1,704,852 | Bath | Mar. 12, 1929 |
| 2,112,290 | Holland | Mar. 29, 1938 |
| 2,448,751 | Volkel | Sept. 7, 1948 |
| 2,478,607 | Theler et al. | Aug. 9, 1949 |
| 2,606,767 | Preston | Aug. 12, 1952 |
| 2,635,395 | Arms et al. | Apr. 21, 1953 |